United States Patent [19]

Blackledge et al.

[11] Patent Number: 5,568,619
[45] Date of Patent: Oct. 22, 1996

[54] METHOD AND APPARATUS FOR CONFIGURING A BUS-TO-BUS BRIDGE

[75] Inventors: John W. Blackledge, Boca Raton, Fla.; Ariel Cohen; Sagi Katz, both of Haifa, Israel; Cindy M. Merkin, Lake Worth, Fla.

[73] Assignee: International Business Machines Corporation, Armonk, N.Y.

[21] Appl. No.: 368,932

[22] Filed: Jan. 5, 1995

[51] Int. Cl.⁶ .......................... G06F 13/00; G06F 13/40
[52] U.S. Cl. .................. 395/281; 395/306; 395/828; 370/85.13; 364/240; 364/240.2; 364/239.9; 364/DIG. 1
[58] Field of Search .................. 395/280, 281, 395/306, 847, 848, 828, 800; 370/85.13, 85.9

[56] References Cited

U.S. PATENT DOCUMENTS

| | | | |
|---|---|---|---|
| 4,797,876 | 1/1989 | Ratcliff | 370/62 |
| 5,274,631 | 12/1993 | Bhardwaj | 370/60 |
| 5,379,384 | 1/1995 | Solomon | 395/308 |
| 5,392,407 | 2/1995 | Heil et al. | 395/293 |
| 5,396,602 | 3/1995 | Amini et al. | 395/293 |
| 5,426,740 | 6/1995 | Bennett | 395/306 |
| 5,446,869 | 8/1995 | Padgett et al. | 395/500 |
| 5,450,551 | 9/1995 | Amini et al. | 395/299 |

*Primary Examiner*—Gopal C. Ray
*Attorney, Agent, or Firm*—R. S. Babayi

[57] ABSTRACT

An information processing system includes a processor for processing information; a processor bus, a first expansion bus; a host bridge for coupling the processor bus to the first expansion bus; a second expansion bus; a first bus bridge for coupling the first expansion bus to the second expansion bus; a plurality of input/output (I/O) devices coupled to the second expansion bus; and a first storage device for storing a first set of configuration data for the plurality of I/O devices; a second storage device for storing additional configuration data. The first storage device includes a register for storing a pointer for pointing to addresses in the first storage device for forwarding addresses sent from the processor to the I/O devices.

12 Claims, 4 Drawing Sheets

FIG. 2
| BYTE 3 | BYTE 2 | BYTE 1 | BYTE 0 | ADDRESS OFFSET |
|---|---|---|---|---|
| PREDEFINED HEADER | | | | 00H - 3PH |
| RESERVED | DISCONNECT COUNTER | SUBORDINATE BUS NO. | BUS NO. | 40H |
| RESERVED | | SPECIAL CYCLE ADDRESS | | 44H |
| RESERVED | | | | |
| RESERVED | | | | |
| | | BRIDGE STATUS | BRIDGE CONFIG. | |
| | | | | |
| | | | | |
| | | | | |
| | | | | |
| | | | | |
| | | | | |
| | | | | |
FIG. 3
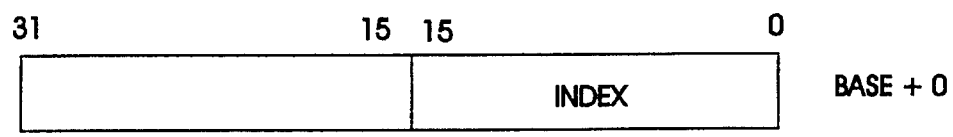
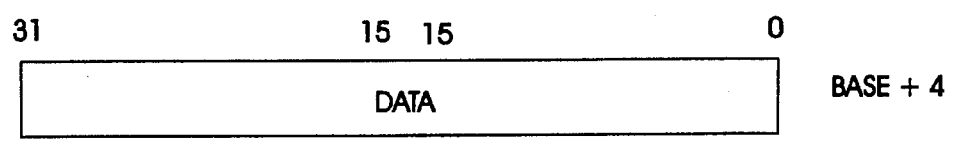

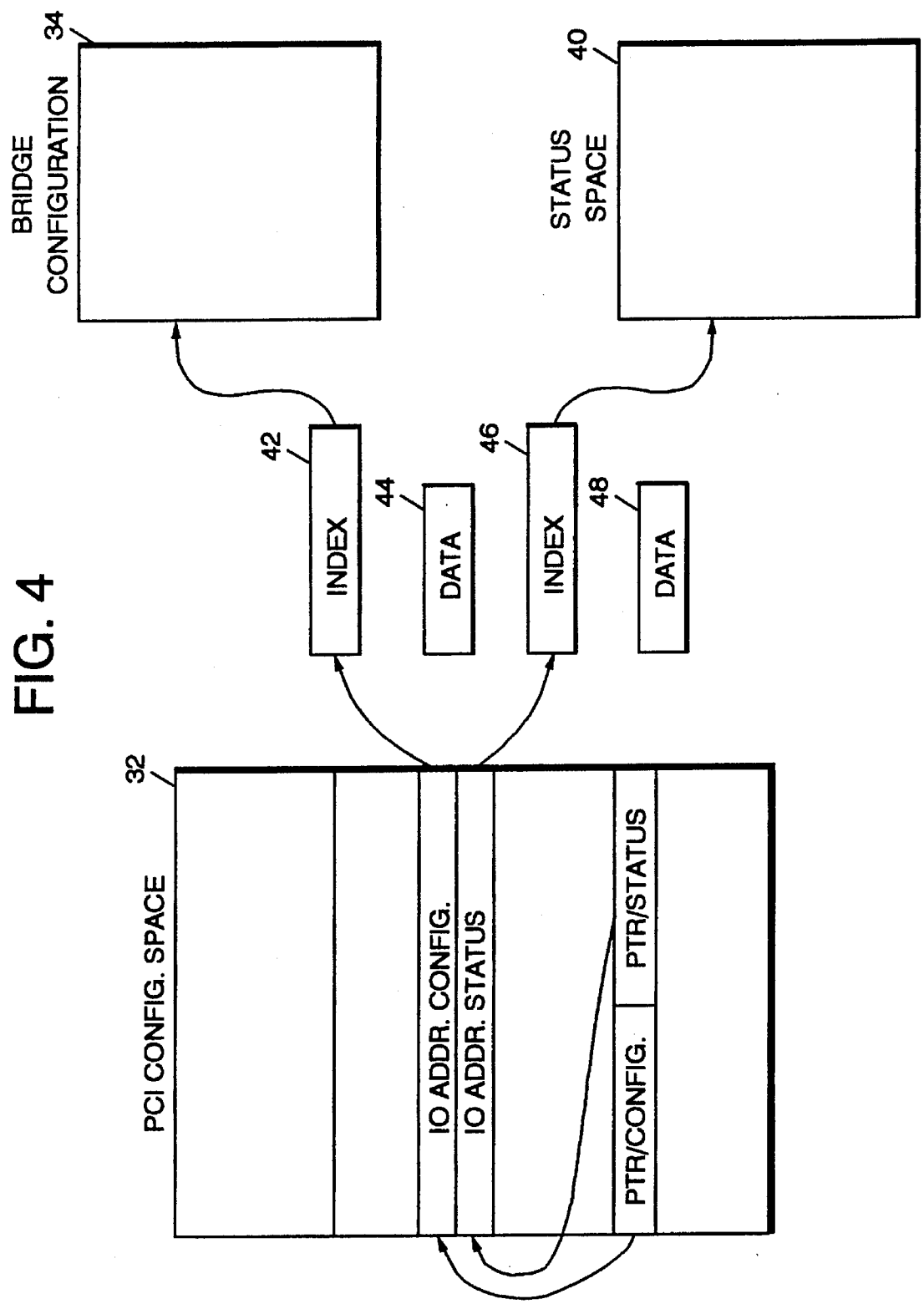

FIG. 5

BRIDGE CONFIGURATION

| 31 | 16 | 15 | 0 | |
|---|---|---|---|---|
| C000 8K ENABLES | D000 8K ENABLES | \multicolumn{2}{c|}{LENGTH OF FIXED AREA} | FIXED FORMAT DATA |
| \multicolumn{4}{c|}{} | |
| \multicolumn{4}{c|}{} | |
| \multicolumn{4}{c|}{} | |
| \multicolumn{4}{c|}{} | |
| \multicolumn{2}{c|}{LENGTH} | \multicolumn{2}{c|}{TYPE - 1} | VARIABLE |
| \multicolumn{2}{c|}{MEM / IO} | \multicolumn{2}{c|}{BASE 1} | |
| \multicolumn{2}{c|}{MEM / IO} | \multicolumn{2}{c|}{LENGTH 1} | |
| \multicolumn{2}{c|}{MEM / IO} | \multicolumn{2}{c|}{BASE 2} | |
| \multicolumn{2}{c|}{MEM / IO} | \multicolumn{2}{c|}{LENGTH 2} | |
| \multicolumn{4}{c|}{} | |
| \multicolumn{4}{c|}{MEM / IO BASE n} | VARIABLE |
| \multicolumn{2}{c|}{LENGTH} | \multicolumn{2}{c|}{TYPE - 2} | |
| \multicolumn{2}{c|}{BACP CONTROL REG} | \multicolumn{2}{c|}{BACP BANK @ GRANT REG} | |
| \multicolumn{2}{c|}{BACP BANK @ IDLE REG} | \multicolumn{2}{c|}{ETC...} | |
| \multicolumn{4}{c|}{} | |
| \multicolumn{2}{c|}{LENGTH} | \multicolumn{2}{c|}{TYPE - 0} | VARIABLE |
| \multicolumn{2}{c|}{PACP MODE REG.} | \multicolumn{2}{c|}{PACP CONTROL REG.} | |
| \multicolumn{2}{c|}{MASTER RETRY TIMER} | \multicolumn{2}{c|}{AGENT @ ACR} | |
| \multicolumn{2}{c|}{ETC.} | \multicolumn{2}{c|}{} | |

METHOD AND APPARATUS FOR CONFIGURING A BUS-TO-BUS BRIDGE

BACKGROUND OF THE INVENTION

The present invention relates to personal computer systems and more particularly to personal computer systems having multiple bus architectures.

Computer systems typically include more than one bus, each bus in the system having devices attached thereto which communicate locally with each other over the bus. Examples of the different types of buses present in typical computer systems are a local bus, to which the host central processing unit (CPU) is directly coupled, a system bus to which the host central processing unit is also coupled, and one or more peripheral (or I/O) buses. System-wide communication over different buses is required, To permit system-wide communication between devices on different buses, bus-to-bus bridges (interfaces) are provided to match the communications protocol of one bus with that of another.

Each bus-to-bus bridge in a multi-bus computer system is used to connect two buses in the system. Various types of buses are available to construct a given computer system. One such bus which is becoming widely accepted is the PCI (Peripheral Component Interconnect) bus, which is capable of performing significant data transfer in a relatively short period of time (up to 120 megabytes of data per second). The PCI bus achieves this high level of performance, in part, because it may be directly linked to other high speed buses, such as system buses to which a CPU may be connected, and thus may provide for rapid transfer of data between devices attached to the PCI bus and devices attached to the system bus. In fact, the operation of several high integration devices, such as certain graphics package controllers, require a direct link to a system bus through a high performance bus such as the PCI bus. In addition, the PCI bus architecture does not require any "glue logic" to operate peripheral devices connected to it. Glue logic for other buses typically consists of miscellaneous hardware components such as decoders, buffers or latches that are installed intermediate the peripheral devices and the bus.

The primary PCI bus operates on a synchronous clock signal of 33 MHz, and the strings of data transmitted over the PCI bus are 32 bits long. A 32-bit data string on the PCI bus is called a double word (DWORD), which is divided into 4 bytes each comprising 8 bits of data. The address and data information carried by the PCI bus are multiplexed onto one signal. Multiplexing eliminates the need for separate address and data lines, which in turn, reduces the amount of signals required in a PCI bus environment as opposed to other bus architectures. The number of signals required in PCI bus architecture is between 45–47 while non-multiplexed buses typically require twice this number. Accordingly, because the number of signals are reduced, the number of connection pins required to support a device linked to the PCI bus is also reduced by a corresponding number. PCI architecture is thus particularly adapted for highly integrated desktop computer systems.

A more detailed description of the structure and operation of PCI bus architecture is provided in "Peripheral Component Interconnect (PCI) Revision 2.0 Specification", published Apr. 30, 1993; "Preliminary PCI System Design Guide", revision 0.6, published Nov. 1, 1992, and "Peripheral Component Interconnect (PCI) Add-in Board/Connector Addendum", (Draft) published 6 Nov. 1992; all by the PCI Special Interest Group, the contents of which references are incorporated herein by reference as if they were fully set forth.

One example of an I/O bus that can be coupled to a PCI bus is the Micro Channel bus. Micro Channel buses can be coupled to the PCI bus via a bridge controller. The purpose of the bridge controller is to transform PCI signals and protocol to Micro Channel signals and protocol and vise versa. In addition, the bridge controller must determine which addresses (both I/O and memory) are in use by devices on its bus. The PCI specification provides two methods for recognizing addresses: (1) subtractive decode and (2) positive decode. The subtractive decode method requires minimum hardware circuitry, however, it introduces delays while the bridge waits to determine if another device responds to the address. Also, only one bridge on a bus may use subtractive decode. The positive decode method uses address registers inside the bridge controller to determine which address to claim and pass on to the devices coupled to the bridge's secondary bus. For PCI to Micro Channel bridges, the number of address range registers required depends on the number of slots on the Micro Channel, the types of devices and the number of devices on the bus. Another factor that may affect the number of registers is the number of other Micro Channel buses attached to the same PCI bus.

Developments in the personal computer industry, such as the PCI bus, cause operating system and other software to be changed to or extended to effectively use the hardware. As the hardware evolves over time, the impacts to software continue. Therefore, there is a need for a computer system to avoid or minimize the software impacts as the hardware evolves.

SUMMARY OF THE INVENTION

Briefly, in accordance with the invention, an information processing system comprises: a processor for processing information; a processor bus, coupled to the processor; a first expansion bus, coupled to the processor bus; a host bridge for coupling the processor bus to the first expansion bus; a second expansion bus; a first bus bridge for coupling the first expansion bus to the second expansion bus; a plurality of input/output (I/O) devices coupled to the second expansion bus; and first storage means for storing a first set of configuration data for the plurality of I/O devices; second storage means for storing additional configuration data; the first storage means including a register for storing a pointer for pointing to addresses in the first storage means; and means for forwarding addresses sent from the processor to the I/O devices.

BRIEF DESCRIPTION OF THE DRAWING(S)

FIG. 2 shows bridge configuration and status space index and data registers.

FIG. 3 shows bridge configuration pointers to status and configuration space.

FIG. 4 shows bridge configuration and status space fields.

FIG. 5 is a simplified block diagram of a PCI bus bridge.

DESCRIPTION OF THE ILLUSTRATIVE EMBODIMENT(S)

Figure 1:
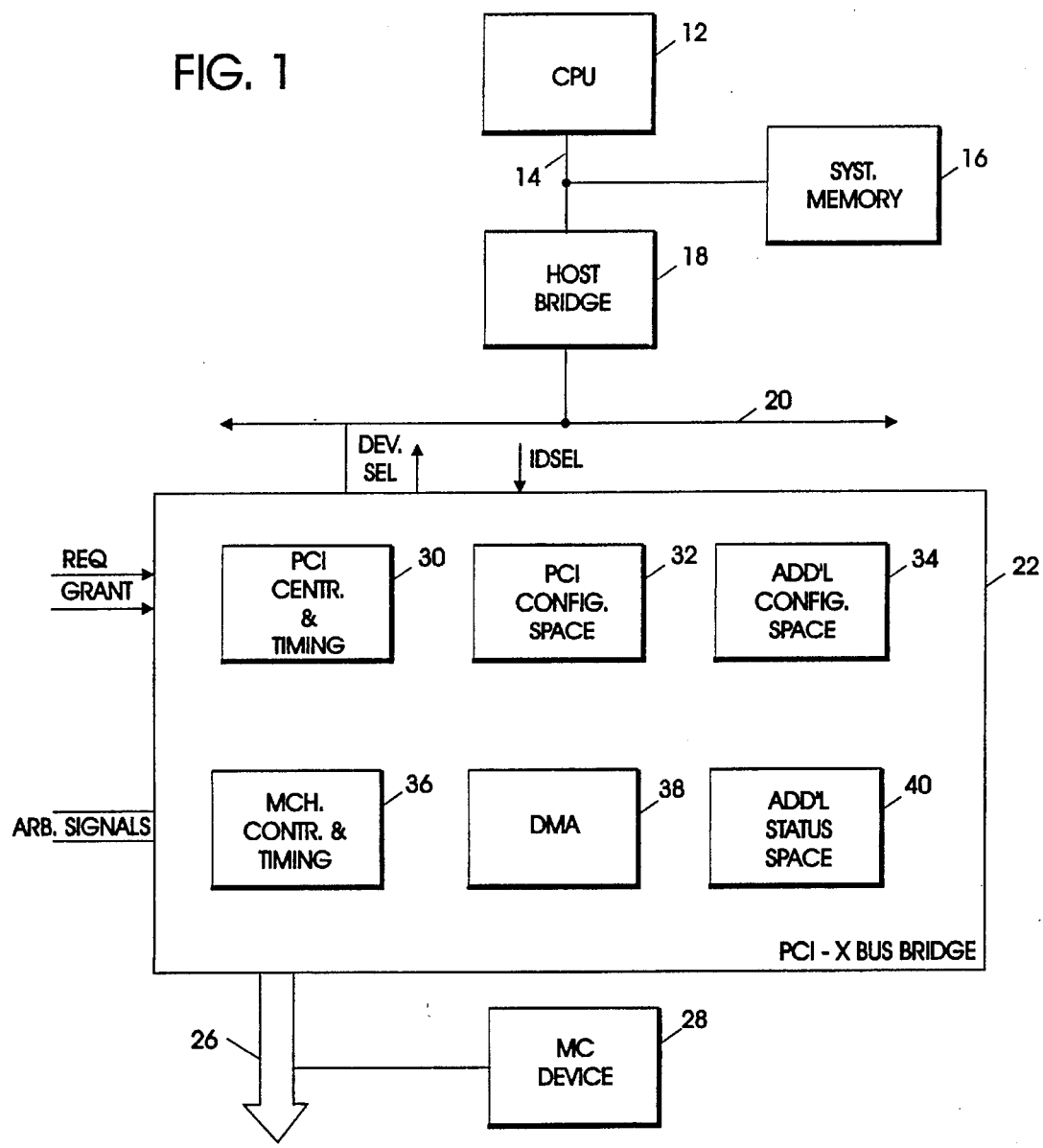
FIG. 1 is a simplified block diagram of a computer system including a hierarchical bus structure in which the present invention may be advantageously used.

Implementations of IBM Personal Systems/2 and Personal RISC Systems may contain a PCI bus as the primary bus with Micro Channel or ISA buses subordinate to the primary PCI bus. The PCI bus structure is hierarchial and PCI buses may also be subordinate to the primary PCI bus.

Referring to FIG. 1, there is shown a simplified block diagram of a computer system 10. In this system, a processor unit (or CPU) 12 is coupled to a processor (or host) bus 14. The processor 12 interfaces with a system memory 14 which includes instructions for the processor 12. A host bridge 18 couples the host bus 14 to a first expansion bus 20. In the preferred embodiment, the first expansion bus is designed in accordance with the PCI standard. An expansion bridge 22 couples a second expansion bus (e.g., a second PCI bus or a Micro channel bus) to the first expansion bus. Other I/O devices can also coupled to the first expansion bus 20. An I/O device 28 is coupled to the expansion bus 26.

During the power-on sequence, the system must determine which I/O devices are coupled to buses in the system. Accordingly, each bridge requires storage space for configuration parameters to identify the I/O devices coupled to the system buses. The PCI specification requires that each PCI device (including bus bridges) contain a configuration space. The configuration space is a set of 256 registers that are accessible by the host processor 12. The configuration space contains information that identifies the device and the system resources that the device uses. Six of the configuration registers are used to select the memory or I/O addresses the device uses. These registers are called Base Address Registers.

The PCI configuration space contains a 64 byte header that is common to all PCI devices. The remaining 192 bytes may be used for device specific information. This 192 byte limitation is inadequate to construct a durable long term solution for bridge controllers. In order to use a positive decode scheme to improve system performance, a number of address range registers are required to identify all of the devices on the bus below (i.e., subordinate to) the subject bus bridge. Thus, in accordance with the invention, a bridge controller configuration and status space has been defined.

The bus bridge 22 includes additional configuration and status space in accordance with the invention. In this embodiment the bridge 22 couples a PCI bus 20 to a Micro channel bus 26. The bridge 22 includes PCI control and timing circuitry 30, storage space for PCI configuration space 32. Additional configuration space 34 is also provided in the bridge 34, but could be also be provided in memory that is not in the bridge 22. Micro Channel control and timing circuitry 36 is provided to control the timing on the Micro Channel bus 26. A direct memory management (DMA) block 38 provides for transfer of information without processor intervention. Additional status space is also provide in the bridge 40 for this example, but, as in the case of the additional configuration space 34, can also be provided elsewhere in the system 10.

Referring to FIG. 2, there is shown a bridge controller PCI header. A pair of anchor pointers are defined in the devices specific PCI configuration space at locations 50 and 51. The anchor pointers point to a pair of base address registers in the configuration header. These base address registers define the I/O addresses for the bridge configuration and address space. The base address registers are shown in FIG. 3.

Referring to FIG. 4, the relationship between the PCI header fields and the bridge configuration space is illustrated. Each block represents a register set in the bus bridge. In accordance with the PCI specification, the configuration space 32 is 256 bytes. Two registers (labelled Ptr./Config. and Ptr/Status) point to I/O address configuration and I/O address status registers, respectively. The I/O address configuration register points to an index 42 into an additional configuration address range. The I/O address status register points to an index 46 for additional status space. To access the bridge configuration or status space, the address of the field in the status space is placed in the index (42 or 48) by an output instruction from the processor 12. The configuration (or status) space information is read (or written) by an input (or an output) to the I/O port that accesses the data.

The bridge configuration space is defined in FIG. 5. In a preferred embodiment, the bridge configuration space is 64 k bytes long and is subdivided into variable length blocks. A length code at the beginning of each block is defined to allow future implementations to expand as necessary. The length and type code allow software to be written generically to use this information with various implementations of hardware. The first block of the configuration space contains implementation specific functions. All subsequent blocks contain a type code along with a length code. The type code identifies the format and characteristics of the data that follows. There is no requirement that each type is present or that blocks a re ordered by type code number. The type code field is 16 bytes wide and, therefore, wide enough to accommodate future expansion requirements.

What is claimed is:

1. An information processing system comprising:
   a processor for processing information;
   a processor bus, coupled to the processor;
   a first expansion bus, coupled to the processor bus;
   a host bridge for coupling the processor bus to the first expansion bus;
   a second expansion bus;
   an expansion bus bridge, for coupling the first expansion bus to the second expansion bus, the expansion bus bridge comprising first storage means for storing a first set of configuration data for a plurality of I/O devices;
   second storage means for storing additional configuration data being subdivided to a plurality of variable length blocks corresponding to said plurality of I/O devices, wherein each block includes a length code for defining the size of a configuration space for each I/O device; and
   the first storage means further comprising a register for storing a pointer for pointing to a set of addresses in the second storage means.

2. The information processing system of claim 1, wherein the expansion bus bridge comprises the second storage means.

3. The information processsing system of claim 1, wherein the first expansion bus is a peripheral component interconnect (PCI) bus.

4. The information processing system of claim 3, wherein the first storage means is for storing 256 bytes of configuration data for the plurality of I/O devices, and the second storage means is for storing a number of bytes of configuration data that is greater than 256 bytes.

5. The information processing system of claim 1, wherein the expansion bus bridge further comprises third storage means for storing a first set of status data.

6. The information processing system of claim 5, further comprising fourth storage means for storing additional status data.

7. The information processing system of claim 6, wherein the fourth storage means is incorporated in the expansion bus bridge.

8. In an information processing system including a processor, a processor bus, coupled to the processor, a first expansion bus, coupled to the processor bus, a host bridge for coupling the processor bus to the first expansion bus, a second expansion bus, a plurality of I/O devices coupled to the second expansion bus, an expansion bus bridge, for coupling the first expansion bus to the second expansion bus, the expansion bus bridge comprising:

first storage means for storing a first set of configuration data for a plurality of I/O devices;

second storage means for storing additional configuration data being subdivided to a plurality of variable length blocks corresponding to said plurality of I/O devices, wherein each block includes a length code for defining the size of a configuration space for each I/O device; and the first storage means further comprising a register for storing a pointer for pointing to a set of addresses in the second storage means.

9. The expansion bus bridge of claim 8, wherein the expansion bus is a peripheral component interconnect (PCI) bus.

10. The expansion bus bridge of claim 9, further comprising third storage means for storing a first set of status data.

11. The expansion bus bridge of claim 10, further comprising fourth storage means for storing additional status data.

12. The expansion bus bridge of claim 11, wherein the first storage means is for storing 256 bytes of configuration data for the plurality first storage means of I/O devices, and the second storage means is for storing a number of bytes of configuration data that is greater than 256 bytes.

* * * * *